May 6, 1941.  F. E. MAIER  2,241,147
VEHICLE BODY
Original Filed Feb. 25, 1935
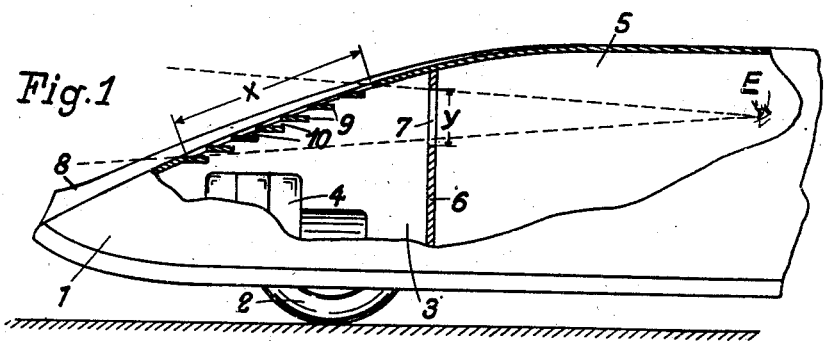
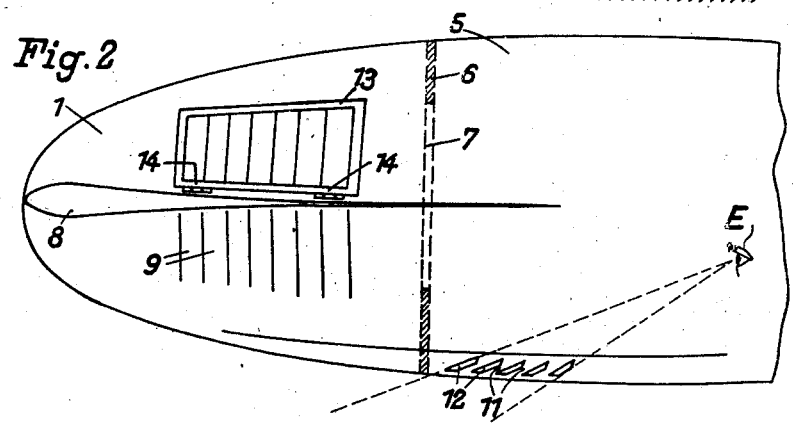
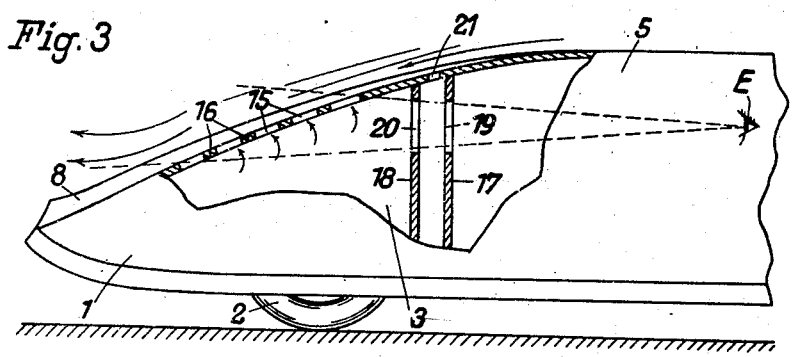
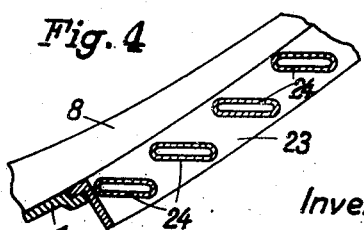
Inventor:
FRIEDRICH EUGEN MAIER
By
Attorneys Patented May 6, 1941

2,241,147

UNITED STATES PATENT OFFICE 2,241,147

VEHICLE BODY

Friedrich Eugen Maier, Berlin-Charlottenburg, Germany

Application February 25, 1935, Serial No. 8,005. Renewed July 20, 1938. In Germany March 19, 1934

3 Claims. (Cl. 296—1)

This invention relates to vehicles of all kinds, that is, road vehicles, ships, and airplanes.

More particularly, it relates to improvements in the bodies of such vehicles, and it is an object of the invention to provide lookout means which is adapted to the shape of the body but which will not admit the ambient air to the interior of the body.

To this end, I provide an observation opening in the body of the vehicle, and bars extending across the opening like a grate or grid.

The bodies of high-speed vehicles are usually more or less streamlined, the ideal being the shape of a raindrop. Bodies of this kind, however, while very useful with respect to the efficiency of propulsion, involve considerable difficulties with respect to the arrangement of windows in their more or less curved or irregular surfaces which often extend at sharp angles to the line of vision.

It is very difficult to provide panes of glass, cellon, or other material for observation openings in such surfaces. For instance, if the portion of the body in which the observation opening and its pane is to be provided, is substantially straight or flat but extends at a small angle to the line of vision, the opening and its pane must be very long for presenting a comparatively short length of projected observation opening. In other words, a small field of vision requires a pane of glass or other transparent material whose size is disproportionately in excess of what would be required if the observation opening were in a more favorable position with respect to the line of vision. While in such cases the difficulty is principally of an economic character, it becomes a technical difficulty if the faces for the observation openings are curved, or otherwise irregular, particularly if the panes are of rigid material such as glass.

Under all conditions, the necessity of providing transparent panes in the aforesaid unfavorable positions, increases the initial cost of the vehicle. The presence of transparent panes is undesirable because they will get fogged, and the presence of glass panes is a permanent risk to the persons in the body in case of collisions and other accidents.

These drawbacks are eliminated according to this invention, and the necessity of providing transparent panes for observation openings is dispensed with by providing bars or grids in the otherwise uncovered observation opening. Such bars or grids may be arranged without difficulty at any point of the body, whatever may be its shape at that point, and preferably are punched or pressed from the body so as to extend across the observation opening like the bars of a Venetian blind. It is not necessary to alter the shape of the body in any way for providing such observation openings, and their bars. In this way, I obtain an observation opening positioned at the rear of a motor car, without necessitating any departure from its aerodynamically favorable shape, and without the extra cost, difficulty and risk involved by such means as glass or cellon panes.

In the accompanying drawing, several arrangements of observation openings according to my invention at the rear and the sides of a motorcar body are illustrated diagrammatically by way of example.

In the drawing

Fig. 1 is an elevation showing the rear end of a motor car, partly broken open.

Fig. 2 is a plan view of Fig. 1.

Fig. 3 is an elevation showing the rear end of a modified motor car, partly broken open.

Fig. 4 is a longitudinal section of a portion of a motor car, drawn to a larger scale, showing an observation opening whose bars are constituted by the flattened tubes of a radiator.

Referring now to the drawing, and first to Figs. 1 and 2, 1 is the rear end of a motor car body, supported on wheels 2. 3 is the engine compartment in which the engine 4 is positioned, and 5 is the compartment for the driver and the passengers. The two compartments are partitioned by a transverse wall 6, with a pane 7 of transparent material therein. The top of the motor car body is equipped with a rib 8 at its rear end, and observation openings are arranged at both sides of the rib. Each observation opening is defined by a plurality of bars 9 and open spaces 10 between the bars. As mentioned, the bars are preferably obtained by punching them from the body and pressing them into the horizontal position illustrated in Fig. 1, or into any other suitable position. If desired, however, the bars may also be independent members which are welded, riveted, or otherwise attached to the car body. The observation openings also serve for the exchange of the air in, and the abduction of heat from, the engine compartment 3 through the intermediate spaces 10 between the bars 9. As shown, the spaces or openings 10 are located in an inclined portion of the car top at the rear thereof. Preferably, the bars 9 are arranged in stepwise fashion and overlap or at least cover the openings 10 entirely, when viewed in a vertical downward direction, thus preventing or minimizing the entrance of rain or snow while permitting a good circulation of air and dissipation of heat.

The compartment 5 is closed against the ambient air by the partition 6 which may be vertical or inclined at any desired angle.

The eye of the driver, or any other person looking to the rear through one of the observation openings between its bars 9, is indicated at E. The lines of vision at the upper and lower ends of the field defined by the openings in the partition and in the body, are shown in dotted lines and it will appear that while the length of the observation openings is $x$ and very considerable, so that the two openings would require large and expensive panes, the height of the pane 7 in the partition 6 is $y$, and less than one-third of the length $x$. It will be noted that at least the lowermost opening 10 is at a level below the one at which the eye E of the driver or other person is located, so that such person will have a view of the road in the rear of the vehicle. Instead of two large panes for the two observation openings, only one small pane 7 is required for the partition. The arrangement of the pane 7 in the body has the additional advantages that it is better protected against damage, and less liable to get fogged than a pane in the shell of the body, because the temperature in the engine compartment is always comparatively high.

Fig. 2 illustrates an observation opening in one side of the vehicle, with bars 12 and intermediate spaces 11, which is otherwise similar to the observation openings with the bars 9. The bars 11 are arranged in stepwise fashion and cover the openings 12, when viewed in a direction transverse to said openings. Such lateral observation openings, while permitting the driver to survey the road at the sides of the vehicle toward the rear, may also serve for ventilating the compartment 5. Lateral observation openings may also be arranged at the rear of the partition 6 which, in this case, obviously requires a transparent pane at the side where the observation opening is. This effects a thorough ventilation of the engine compartment, the air entering through the spaces 12 at the sides of the car body, and flowing out through the spaces 10 at the rear.

As illustrated at one side of the rib 8 in Fig. 2 (the left-hand side of the motor car), the bars 9 and spaces 10 may be formed in a frame or lid 13 which is hinged to the rib 8 at 14 so that it can be turned up to expose the engine 4. Similar arrangements may obviously be provided for the lateral observation openings 11, 12.

Referring now to Fig. 3, this body 1 is equipped with an observation opening at the rear, in the inclined portion of the car top. This observation opening is obtained by punching the spaces 15 between bars 16 which are not bent into horizontal position, like the bars 9 in Figs. 1 and 2, but keep their initial position as parts of the body. As in Fig. 1, at least the lowermost of the spaces or openings 15 is at a level below that of the observer's eye indicated at E, so that the observer may watch a portion of the road in the rear of the car.

Preferably, observation openings are arranged at such parts of the body where the relative wind produces a partial vacuum, so that the air is drawn out through the spaces 10 or 15 between the bars. Flow lines are shown in Fig. 3. On the other hand, it is also possible to utilize observation openings for drawing in air, in which case they obviously must be arranged at points where the relative wind exerts pressure, and by a combination of such arrangements of observation openings, the engine compartment is effectively ventilated, as described with reference to Fig. 2.

Fig. 3 shows a pair of parallel partitions 17 and 18 instead of the single partition 6, between the compartments 3 and 5. The partitions, which are equipped with panes 19 and 20, respectively, are spaced apart to prevent transmission of sound from the engine compartment to the passenger compartment. Preferably the space between the two partitions is connected to the ambient air by means of a port 21 in the body of the vehicle so that sound transmission is still more effectively prevented.

The panes 7, 19 and 20 will not get fogged if the outer temperature is low, because the temperature gradient between the compartments 3 and 5 is never considerable.

Referring now to Fig. 4, this shows a radiator 23 inserted in the observation opening, with its flattened tubes 24 forming the bars. These bars are arranged in stepwise fashion and overlay as illustrated, thus covering the intervening openings, substantially as described with reference to Fig. 1.

Obviously, the possibility of arranging the bars in a frame which is hinged or otherwise connected to the body so that it can be opened, is not limited to the kind of bars illustrated in Figs. 1 and 2, but the bars of Fig. 3 as well as the radiator 23 in Fig. 4, may be assembled in a frame. It will be noted that at least the lower portion of the outlook opening is at a level below the eye of the observer seated in the car or other vehicle, so that such observer will be able to see through said opening, the road on which the vehicle is traveling.

I claim:

1. A vehicle body, said body having a top which includes a rear portion inclined from front to rear, said rear portion having an opening therein, said opening being at least on and extending below the eye level of an occupant normally seated in said body, and a series of spaced bars transversely across said opening to provide slits through which objects at or near the level of the road in the rear of the vehicle can be seen by said occupant normally seated in said vehicle body, the said bars being substantially flat and having their top surfaces substantially parallel to the lie of vision of said occupant so as to interrupt said vision only to the extent of the thickness of said bars.

2. A vehicle body, said body having a top which includes a rear portion inclined from front to rear, said rear portion having an opening therein, said opening being at least on and extending below the eye level of an occupant normally seated in said body, and a series of spaced bars transversely across said opening to provide slits through which objects at or near the level of the road in the rear of the vehicle can be seen by said occupant normally seated in said vehicle body, the said bars being substantially flat and having their top surfaces substantially parallel to the line of vision of said occupant so as to interrupt said vision only to the extent of the thickness of said bars, the said bars being arranged in a substantially overlapping manner for forming a weather-shedding surface.

3. A vehicle body, said body having a top and a rear portion, the top of said rear portion being inclined from front to rear, said rear portion having an opening therein, said opening being at least on and extending below the eye level of an occupant normally seated inside said vehicle body, and radiator elements in the form of a series of spaced bars transversely across said opening to provide slits through which objects at or near the level of the road in the rear of the vehicle can be seen by said occupant normally seated inside said vehicle body, the said bars having their flat surfaces substantially parallel to the line of vision of said occupant so as to interrupt said vision only to the extent of the thickness of said bars, the said inclined rear portion causing the air through which said vehicle moves in forward motion to draw air out through said opening so as to cool said radiator and ventilate said rear portion.

FRIEDRICH EUGEN MAIER.